Patented Dec. 7, 1926.

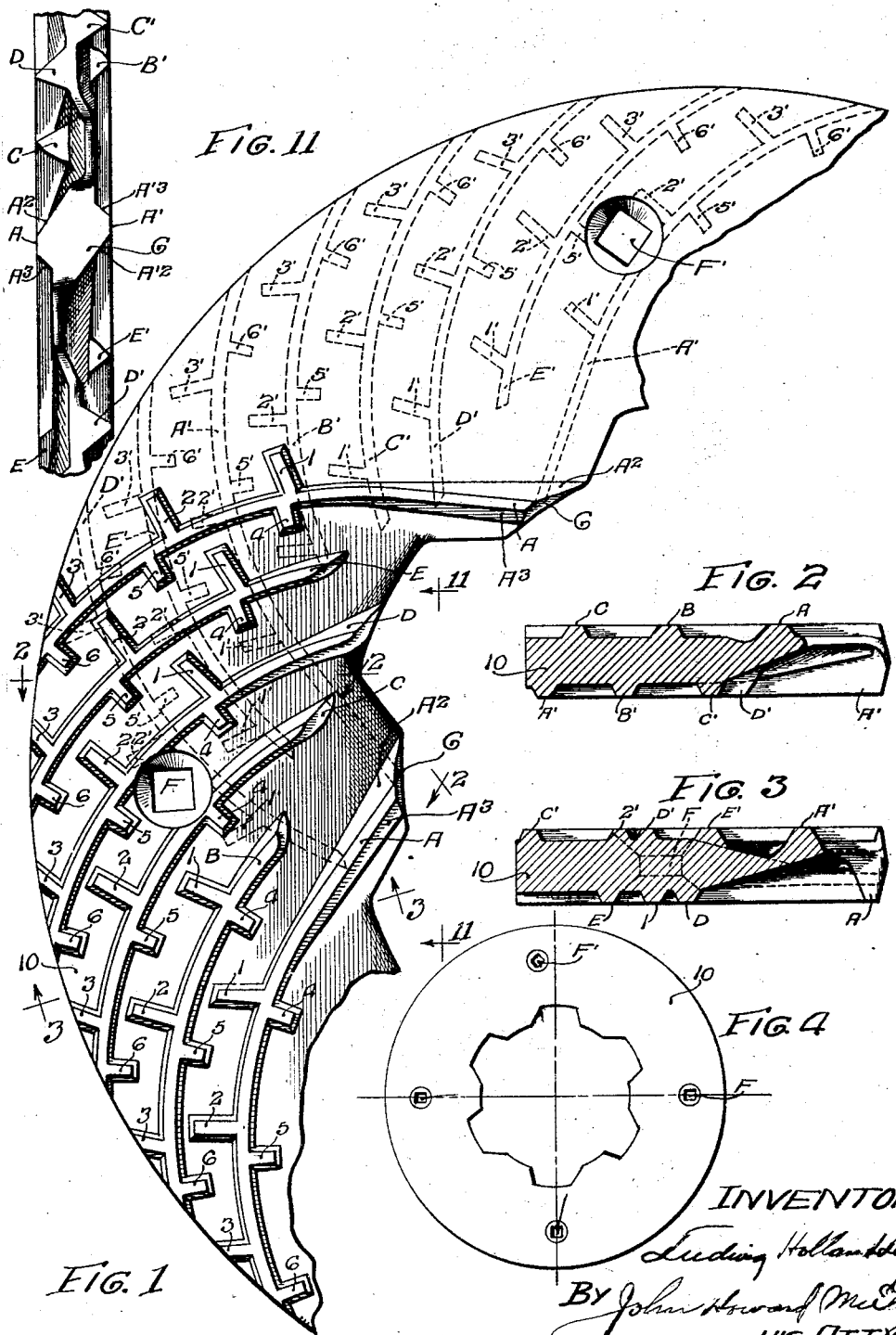

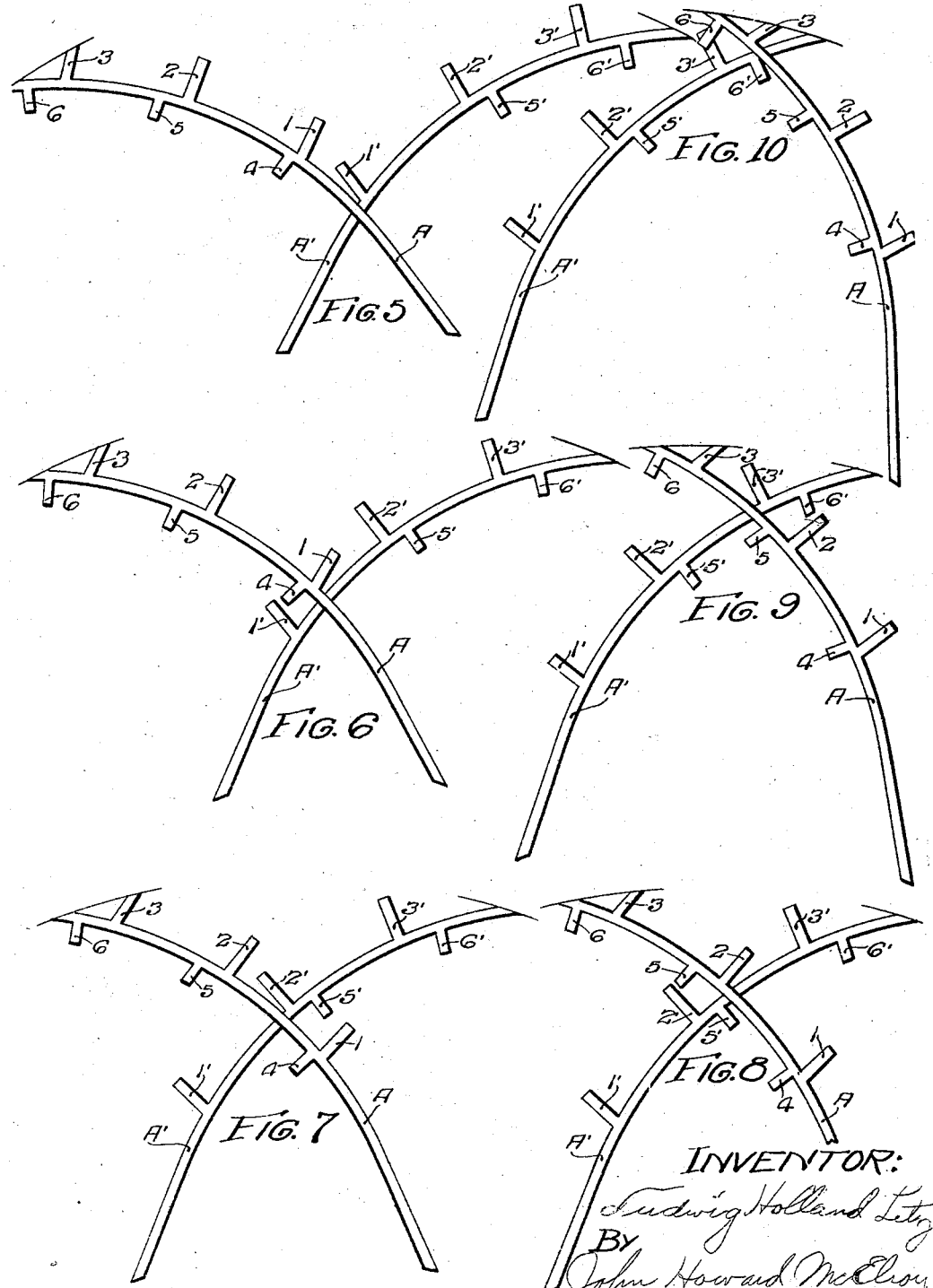

1,609,717

UNITED STATES PATENT OFFICE.

LUDWIG HOLLAND-LETZ, OF CROWN POINT, INDIANA, ASSIGNOR TO THE LETZ MANUFACTURING COMPANY, OF CROWN POINT, INDIANA, A CORPORATION OF INDIANA.

GRINDING BURRS.

Application filed December 1, 1924. Serial No. 753,202.

My invention is concerned with grinding burrs, and more especially with slow-speed burrs in which the feed of the material is not due to the centrifugal force of the material being ground, but to the feeding action of the teeth, and it is designed to produce a pair of burrs of the class described in which the shearing edges of the two burrs can be set in direct contact, and the device will still function without clogging, with the result that very fine grinding can be done on all the numerous different materials ground by the farmers who mainly use them.

To this end, I employ a pair of burrs in which the opposed faces are substantially symmetrical and in which each face has feeding ribs or teeth, preferably curved, extending across the annular surface thereof set at an angle to any radial lines so that as it rotates these feeding teeth force the material outwardly, and associated with these feeding ribs or teeth are the shearing or snipping teeth, which extend substantially at right angles to the feeding ribs on the same plate, and are especially designed so that their edges shear against the feeding ribs of the opposed burr between the shearing teeth of said opposed burr, after which the shearing teeth of the opposed burr co-operate with the portions of the feeding ribs of the first-mentioned burr between its shearing teeth, and so on, the effect being that there is an alternation in the action of the shearing and feeding teeth or ribs of the two burrs, and the shearing teeth of one burr never co-operate directly with the shearing teeth of the other burr, which direct co-operation of the shearing teeth of the two burrs would tend to clog up and choke the grinder, a result that is practically impossible with a pair of burrs constructed in accordance with my invention.

It is further concerned with a burr which has both faces covered with feeding and shearing teeth, the patterns of the teeth on the two sides being different and complementary, whereby the burr can be reversed, both faces being designed for use in grinding, and whereby a single burr contains both the complementary patterns which I find it necessary to use.

Finally, it is concerned with such burrs having the complementary patterns of teeth on the two faces, which are provided with bolt holes, one of which is set irregularly with reference to the others, so that there is no possibility of mounting the burrs upon their supports in a position in which the two burrs will not properly register with each other.

To illustrate my invention, I annex hereto two sheets of drawings, in which the same reference characters are used to designate identical parts in all the figures, of which,—

Fig. 1 is a plan view of a portion of a burr embodying my invention, with some of the teeth on the upper side omitted so that the outline of the teeth on the opposite side, indicated in dotted lines, can be more clearly seen;

Figs. 2 and 3 are sections on the lines 2—2 and 3—3, respectively, of Fig. 1;

Fig. 4 is a diagrammatic view, on a very small scale, illustrating the position of the four bolt holes; and Figs. 5, 6, 7, 8, 9 and 10 are more or less diagrammatic views showing the relative position and co-operation of the various portions of a feeding rib and its associated shearing teeth on each of the two co-operating burrs in different angular positions.

Figure 11 is an enlarged detail view of one of the feeding ribs, A or A'.

In carrying out my invention in its preferred form, I employ an annular base casting 10, on the two sides of which project outwardly the plural series, preferably five, of feeding ribs A, B, C, D and E, each of which has projecting outwardly therefrom the shearing teeth 1, 2 and 3, and inwardly therefrom the shearing and deflecting teeth 4, 5 and 6. These ribs and teeth have their sides slightly inclined and were originally as cast somewhat higher than shown, they being finished by grinding off both faces in parallel planes to provide shearing edges. Assuming that the design so far described is on the rotary burr, the design of the teeth and ribs on the co-operating stationary burr are clearly indicated in dotted lines in Fig. 1, where the same reference letters and numerals primed are used to designate corresponding parts, and it will be noted that the teeth corresponding to teeth 4 on the rotary burr are omitted on the stationary burr, as they would be so close to the inner periphery as to choke the entrance. It will also be noted that, measured from the center, the teeth 1', 1, 2', 2, 3' and 3 occur in the order noted, and that they alternate, as it were, so that none of these six sets of teeth (and the same is true of the other sets, 4, 5′, 5, 6′, and 6) shear against any of the adjacent sets of shearing teeth on the other burr, but only against the feeding ribs of said other burr. This is best shown in Figs. 5 to 10, which are designed to illustrate the co-operation of the ribs A and A′ together with their associated shearing teeth in six different relative positions during the rotation of the burr, and it will be noted that the shearing teeth strike the feeding ribs of the opposed burrs between the shearing teeth of said opposed burrs and at a slight angle thereto so that the shearing action is progressive outwardly along the length of the teeth, like the progressive action of ordinary shear blades. While it is true that a few of what I have called the shearing teeth on the two burrs sometimes cooperate to the extent that their paths intersect, it will be noted from a study of Figs. 5 to 10 inclusive that when they do so, the tooth on one burr is moving in the direction of its length, and intersects the tooth of the other burr substantially at right angles to the direction of the length of said tooth, and that being the case, the shearing action resulting from such undesired cooperation is negligible, and that all the intended and substantial shearing action results from the cooperation of the shearing teeth of one burr with the feeding ribs of the other burr.

The teeth 4, 5 and 6 have some function as shearing teeth, but as they project between the teeth 1, 2 and 3 of the adjacent rib on the same burr, they form a tortuous passage which impedes the outward movement of the material, and assists as well as insures the complete shearing and grinding of all the material by deflecting long material over to the shearing ribs, a result that I have found could not be secured if the teeth 4, 5 and 6 and 5′ and 6′ were omitted.

With the construction shown, the burrs are set so that the shearing faces of the feeding ribs and shearing teeth of the two burrs are directly in contact, and as a result, all the material will be cut and recut until it is ground fine in passing from the inner periphery to the outer periphery of the burrs.

As is best seen from Figs. 2 and 3, I preferably employ a set of teeth on each of the two faces of the burr, so that they can be reversed, and it will be understood that I might employ on one side of the burr the teeth as shown in full lines in Fig. 1, and on the other side the teeth as shown in dotted lines, in which case only one design of burr need be employed. Or I might employ the same design on both sides of the burr, in which case two different designs would be necessary, each grinder necessarily employing one of each of the two designs. In order to insure the burrs being properly mounted where there are two different designs on the two faces, instead of having the four bolt holes F spaced apart equidistantly, I locate one of them, F′, in an irregular position relative to the other, and it will be understood, of course, that the bolt holes on the supporting members for the burrs are similarly spaced apart so that it is impossible to get them in incorrect position.

By reference to Figs. 1 and 11, it will be seen that due to the exceptional length of the feeding ribs A and A′, it is necessary to form on the inner periphery what I may call an inwardly directed extension G to accommodate their inner ends, and it will also be seen that the leading side A² of the feeding rib A at its inner end is much deeper than its other side A³, and the same thing is true of the corresponding sides of the feeding rib A′, which has the top surface of its end directly beneath or opposite the corresponding surface of the inner end of the rib A. This arrangement of the ends of the two ribs A and A′ enables me to get a large and deep opening just in advance of each tooth A and A′ between the opposing faces of the two burrs and increases materially the feeding capacity of the grinder over what it would be if it were not for this construction.

While I have shown and described my invention as embodied in a form which I at present consider well adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a grinding machine, the combination of an annular burr having feeding ribs extending across the annular surface at a feeding angle and also provided with shearing teeth extending from the ribs at considerable intervals, with a similar burr having similar feeding ribs and similar shearing teeth, the feeding ribs of one burr being adapted alternately to coact with the shearing teeth of the other burr, and vice versa, so that the shearing teeth of the two burrs never directly coact.

2. In a grinding machine, the combination of an annular burr having feeding ribs extending across the annular surface at a feeding angle and also provided with shearing teeth extending from the ribs at considerable intervals from both sides thereof, with a similar burr having similar feeding ribs and similar shearing teeth, the feeding ribs of one burr being adapted alternately to coact with the shearing teeth of the other burr, and vice versa, so that the shearing teeth of the two burrs never directly coact.

3. In a grinding machine, the combination of an annular burr having feeding ribs extending across the annular surface at a feeding angle and also provided with shearing teeth extending from the ribs at considerable intervals from both sides thereof, with a similar burr having similar feeding ribs and similar shearing teeth, the feeding ribs of one burr being adapted alternately to coact with the shearing teeth of the other burr, and vice versa, so that the shearing teeth of the two burrs never directly coact, the shearing teeth of adjacent ribs extending between each other so as to form a tortuous passage between adjacent ribs.

4. In a grinding machine, the combination of an annular burr having feeding ribs extending across the annular surface at a feeding angle and also provided with shearing teeth extending from the ribs at considerable intervals, with a similar burr having similar feeding ribs and similar shearing teeth, the feeding ribs of one burr being adapted alternately to coact with the shearing teeth of the other burr, and vice versa, so that the shearing teeth of the two burrs never directly coact, said burrs being provided with engaging means for securing them to their supports, one of said engaging means being set irregularly with reference to the remaining engaging means of the burr, substantially as and for the purpose described.

5. As a new and useful article of manufacture, a double-faced grinding burr having an annular base from both faces of which project feeding ribs and cooperating shearing teeth, the shearing faces of the sides being ground in parallel planes and the shearing teeth on the two sides being placed at different distances from the center, for the purpose described.

6. In a grinding machine, the combination of an annular burr having curved feeding ribs extending across the annular surface at a feeding angle and also provided with shearing teeth extending from the ribs at considerable intervals, with a similar burr having similar feeding ribs and similar shearing teeth, the feeding ribs of one burr being adapted alternately to coact with the shearing teeth of the other burr, and vice versa, so that the shearing teeth of the two burrs never directly coact.

7. In a grinding machine, the combination of an annular burr having feeding ribs extending across the annular surface at a feeding angle and also provided with shearing teeth extending from the ribs at considerable intervals from both sides thereof, with a similar burr having similar feeding ribs and similar shearing teeth, all of said shearing teeth extending at a substantial angle to any circle intersecting the same and drawn with the axis of the burr as a center.

8. In a grinding machine, the combination of an annular burr having feeding ribs extending across the annular surface at a feeding angle and also provided with shearing teeth extending from the ribs at considerable intervals from both sides thereof, with a similar burr having similar feeding ribs and similar shearing teeth, all of said shearing teeth extending at a substantial angle to any circle intersecting the same and drawn with the axis of the burr as a center, and the shearing teeth of adjacent ribs extending between each other to form a tortuous passage between adjacent ribs.

9. In a grinding machine, the combination of an annular burr having feeding ribs extending across the annular surface at a feeding angle and also provided with shearing teeth extending from the ribs at considerable intervals, with a similar burr having similar feeding ribs and similar shearing teeth, the feeding ribs of one burr being adapted alternately to coact with the shearing teeth of the other burr, and vice versa, so that the shearing teeth of the two burrs never directly coact, the shearing teeth of one burr being set at such an angle to the feeding ribs of the other burr that when they coact there is a progressive shearing action, substantially as described.

In witness whereof, I have hereunto set my hand this 20th day of November, 1924.

LUDWIG HOLLAND-LETZ.